(12) United States Patent
Aso et al.

(10) Patent No.: US 7,203,080 B2
(45) Date of Patent: Apr. 10, 2007

(54) DC CONVERTER

(75) Inventors: Shinji Aso, Niiza (JP); Ryuichi Furukoshi, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 0 days.

(21) Appl. No.: 11/320,640

(22) Filed: Dec. 30, 2005

(65) Prior Publication Data
US 2006/0146584 A1 Jul. 6, 2006

(30) Foreign Application Priority Data
Jan. 6, 2005 (JP) ............................ 2005-001399

(51) Int. Cl.
*H02M 3/335* (2006.01)

(52) U.S. Cl. .......................... 363/95; 363/97
(58) Field of Classification Search .................. 363/15, 363/16, 95, 97, 131
See application file for complete search history.

(56) References Cited

U.S. PATENT DOCUMENTS

| 4,535,399 | A | * | 8/1985 | Szepesi ...................... 363/41 |
| 4,772,995 | A | * | 9/1988 | Gautherin et al. ......... 363/21.1 |
| 5,621,625 | A | * | 4/1997 | Bang ........................... 363/21.1 |
| 6,888,728 | B2 | * | 5/2005 | Takagi et al. ................. 363/17 |
| 7,072,192 | B2 | * | 7/2006 | Kakiuchi ...................... 363/50 |

FOREIGN PATENT DOCUMENTS

| JP | 5-176533 | 7/1993 |
| JP | 2000-92829 | 3/2000 |

OTHER PUBLICATIONS

U.S. Appl. No. 11/320,640, filed Dec. 30, 2005, Aso et al.
U.S. Appl. No. 11/355,166, filed Feb. 16, 2006, Aso et al.
U.S. Appl. No. 11/357,161, filed Feb. 21, 2006, Aso et al.
U.S. Appl. No. 11/369,871, filed Mar. 8, 2006, Aso et al.

* cited by examiner

*Primary Examiner*—Adolf Berhane
(74) *Attorney, Agent, or Firm*—Oblon, Spivak, McClelland, Maier & Neustadt, P.C.

(57) ABSTRACT

A DC converter has a main switch connected in series to a primary winding of a transformer, and a series circuit of a capacitor and an auxiliary switch that is connected to both ends of the primary winding of the transformer or to both ends of the main switch, and also rectifies and smoothes a voltage of a secondary winding of the transformer to provide a DC output by alternate ON/OFF operations of the main switch and the auxiliary switch. This DC converter includes an error detector that detects an error by comparing the DC output to a reference voltage, a control circuit that controls ON/OFF of the main switch and the auxiliary switch based on the error detected by the error detector, and an activator that activates the control circuit by supplying, as power, an output of a joint of the auxiliary switch and a capacitor to the control circuit.

9 Claims, 10 Drawing Sheets

DC CONVERTER

BACKGROUND OF THE INVENTION

The present invention relates to a highly reliable and highly efficient DC converter.

Figure 1:
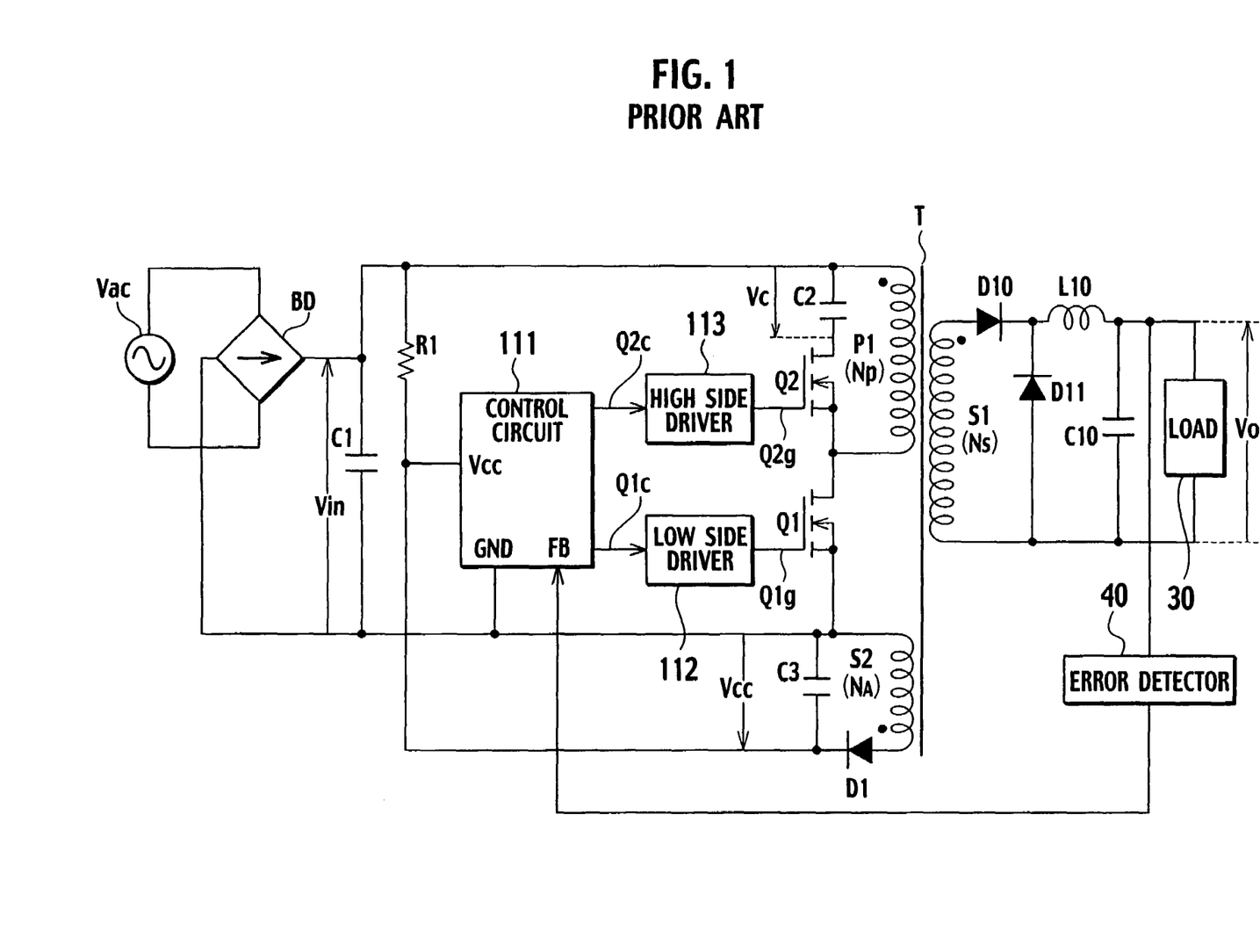
FIG. 1 is a circuit configuration diagram of a conventional DC converter.

FIG. 1 is a circuit configuration diagram of a conventional DC converter, which is disclosed in Japanese Patent Application Laid-Open No. JP2000-92829. The DC converter shown in FIG. 1 employs an active-clamp topology, and includes a bridge circuit BD that rectifies an AC voltage supplied from an AC power supply Vac and also a capacitor C1 that smoothes outputs of the bridge circuit BD. A series circuit of a primary winding P1 (the number of turns is Np) of a transformer T and a MOSFET (hereinafter, FET) operable as a main switch Q1 is connected to both ends of the capacitor C1. A voltage across the capacitor C1 is an input voltage Vin.

A series circuit of an FET and the like operable as an auxiliary switch Q2 and a capacitor C2 is connected to both ends of the primary winding P1 of the transformer T. The main switch Q1 and the auxiliary switch Q2 are turned ON/OFF alternately by PWM control of a control circuit 111.

A secondary winding S1 (the number of turns is Ns) of the transformer T has a winding structure to generate a voltage in phase with that of the primary winding P1 of the transformer T. A rectifying and smoothing circuit having diodes D10 and D11, a reactor L10, and a capacitor C10 is connected to this secondary winding S1. This rectifying and smoothing circuit rectifies and smoothes a voltage induced in the secondary winding S1 of the transformer T (ON/OFF-controlled pulse voltage), and supplies a DC output to a load 30.

An auxiliary winding S2 (the number of turns is $N_A$) of the transformer T has a winding structure to generate a voltage in opposite phase to that of the primary winding P1 of the transformer T. A rectifying and smoothing circuit which has a diode D1 and a capacitor C3 is connected to this auxiliary winding S2. This rectifying and smoothing circuit rectifies and smoothes a voltage induced in the auxiliary winding S2 of the transformer T, and supplies an obtained DC voltage to the control circuit 111 as a voltage Vcc.

The control circuit 111 generates a Q1 control signal Q1c having a pulse for controlling ON/OFF of the main switch Q1 and a Q2 control signal Q2c having a pulse for controlling ON/OFF of the auxiliary switch Q2 (Q2 control signal Q2c has an inverted phase to the Q1 control signal Q1c) based on an error voltage supplied from an error detector 40 (a difference voltage between an output voltage Vo and a reference voltage), and controls duty ratios of the Q1 control signal Q1c and the Q2 control signal Q2c so that the output voltage Vo becomes a predetermined value.

The DC converter further includes a low side driver 112 and a high side driver 113. The low side driver 112 generates a Q1 gate signal Q1g by amplifying the Q1 control signal Q1c of the control circuit 111, and applies the Q1 gate signal Q1g to the gate of the main switch Q1 to activate it. The high side driver 113 generates a Q2 gate signal Q2g by amplifying the Q2 control signal Q2c of the control circuit 111, and applies the Q2 gate signal Q2g to the gate of the auxiliary switch Q2 to activate it.

Operations of the DC converter thus configured will be described next with reference to timing charts shown in FIGS. 2 to 5.

Assuming that the duty ratio of the main switch Q1 (a percentage where the main switch Q1 is ON) is D (0<D<1), the output voltage Vo can be given by the following expression (1), $$Vo = Vin(Ns/Np)D \qquad (1).$$

Since a voltage applied to the primary winding P1 of the transformer T while the main switch Q1 is ON is equal to a voltage applied to the primary winding P1 of the transformer T while the auxiliary switch Q2 is OFF, we have the following expression (2), $$Vin \cdot D = Vc(1-D) \qquad (2).$$

Since the expression (2) can be arranged as, $$Vc = Vin \cdot D/(1-D) \qquad (3).$$

Referring to the expression (1), we find that, $$D = (Vo/Vin) \cdot (Np/Ns) \qquad (4).$$

Accordingly, the voltage Vc across the capacitor C2 is determined, using the expressions (3) and (4), by a following expression, $$Vc = (Vo \cdot (Np/Ns))/(1-(Vo/Vin) \cdot (Np/Ns)) \qquad (5).$$

This expression is based on the premise that a relationship of 0<(Vo·Np)/(Vin·Ns)<1 is satisfied. Therefore, the voltage Vc increases with decreasing input voltage Vin.

Figure 2:
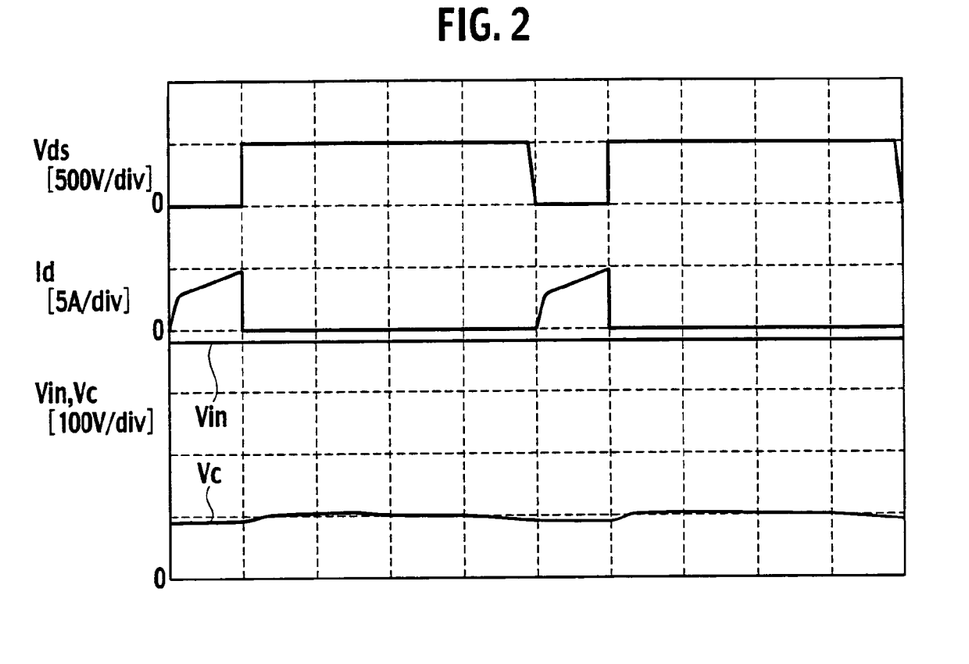
FIG. 2 is a timing chart of operations of the DC converter shown in FIG. 1 performed when a high input voltage is applied.
Figure 3:
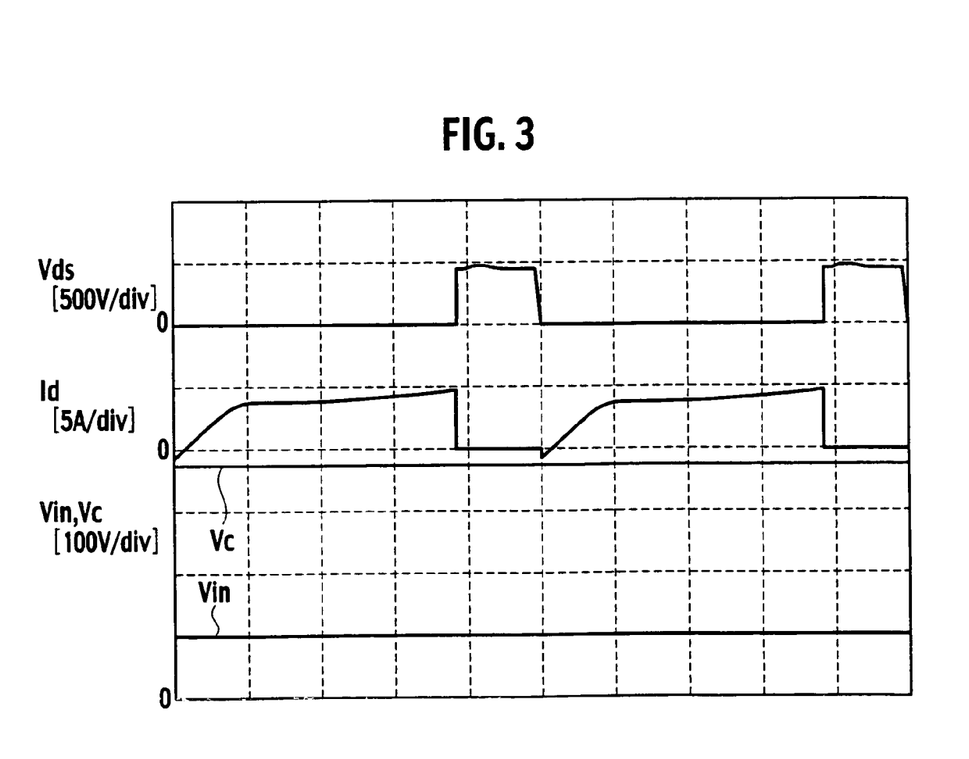
FIG. 3 is a timing chart of operations of the DC converter shown in FIG. 1 performed when a low input voltage is applied.

FIGS. 2 and 3 are waveform diagrams for explaining the relationship between the input voltage Vin and the voltage Vc across the capacitor C2 in the conventional DC converter. FIG. 2 shows an operational waveform when the input voltage Vin is high, and FIG. 3 shows an operational waveform when the input voltage Vin is low.

As shown in FIG. 2, when the input voltage Vin is high, for example, 375V, an ON-period of the main switch Q1 (a period for which a drain-source voltage Vds indicates L-level) becomes short in order to obtain, for example, an output voltage Vo of 24V and an output current of 10A. During the ON-period of the main switch Q1, a drain current Id flows into the main switch Q1 through the primary winding P1 of the transformer T. In this case, the voltage Vc across the capacitor C2 is about 100V.

On the other hand, as shown in FIG. 3, when the input voltage Vin is low, for example, 100V, the ON-period of the main switch Q1 becomes long in order to obtain, for example, an output voltage Vo of 24V and an output current of 10A. In this case, the voltage Vc across the capacitor C2 is about 370V, which is high.

Figure 4:
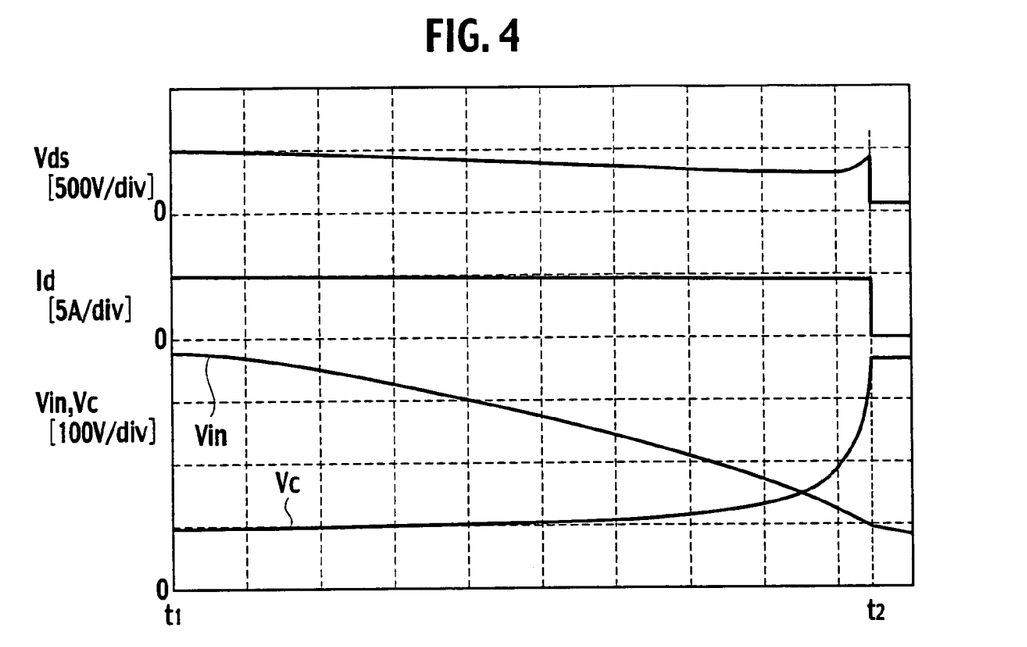
FIG. 4 is a timing chart of operations performed as the DC converter shown in FIG. 1 is shifted from an ON-state to an OFF-state.

Consequently, when the supply from the AC power supply Vac is stopped at time t1 in the DC converter shown in FIG. 1, envelope waveforms (loci of the maximum values of each waveform) become as shown in FIG. 4, where the input voltage Vin decreases gradually, and the voltage Vc across the capacitor C2 increases gradually. Accordingly, the voltage Vcc generated at the auxiliary winding S2, the diode D1, and the capacitor C3 decreases. When the voltage Vcc reaches a stop voltage of the control circuit 111 at time t2, the control circuit 111 stops, and then the main switch Q1 and the auxiliary switch Q2 become an OFF-state. Therefore, the discharge path of the capacitor C2 is eliminated, so that a large voltage Vc is held across the capacitor C2.

Figure 5:
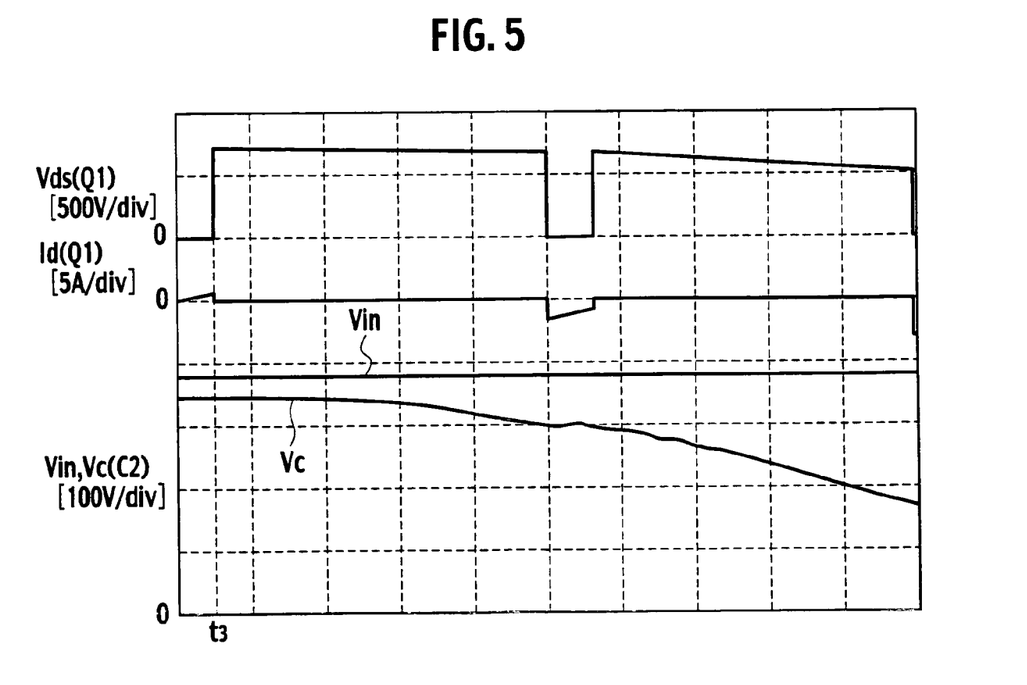
FIG. 5 is a timing chart of operations performed as the DC converter shown in FIG. 1 is shifted from the OFF-state to the ON-state.

In this state, when the AC power supply Vac is turned on again and the input voltage Vin is reapplied, the voltage Vcc increases through a starting resistor R1 operable as an activator, and when the voltage Vcc reaches an activation voltage of the control circuit 111, the main switch Q1 and the auxiliary switch Q2 start switching operations such that they are turned ON/OFF alternately. At this time, envelope waveforms (loci of the maximum values of each waveform) become as shown in FIG. 5. When the auxiliary switch Q2 is turned on at time t3, a voltage of [Vc+Vin], which is the sum of the high voltage Vc being held at the capacitor C2 and the input voltage Vin, is applied to the main switch Q1. That is, a large voltage which is not applied in a steady state is applied to the main switch Q1, and therefore a device with a high withstand voltage must be used for the main switch Q1 to prevent damage thereto.

SUMMARY OF THE INVENTION

As described above, in a conventional DC converter using an active-clamp topology, the main switch Q1 and the auxiliary switch Q2 are turned OFF together when the DC converter is stopped, which causes a high voltage Vc at the charged capacitor C2, thus a voltage larger than that in the steady state is applied to the main switch Q1 when the DC converter is started again.

As a result, the main switch Q1 is damaged or a device with a high withstand voltage must be used for the main switch Q1 to prevent such damage, which disadvantageously makes the DC converter more expensive and decreases efficiency.

The present invention has been achieved to overcome the above problem, and can provide an inexpensive DC converter which is highly reliable and efficient.

The present invention employs the following means to solve the above problem. According to a first technical aspect of the present invention, there is provided a DC converter that has a main switch connected in series to a primary winding of a transformer, and a series circuit of a capacitor and an auxiliary switch, the series circuit being connected to both ends of the primary winding of the transformer or to both ends of the main switch, and also that rectifies and smoothes a voltage of a secondary winding of the transformer to provide a DC output by alternate ON/OFF operations of the main switch and the auxiliary switch. This DC converter includes: an error detector that detects an error by comparing the DC output to a reference voltage; a control circuit that controls ON/OFF of the main switch and the auxiliary switch based on the error detected by the error detector; and an activator that activates the control circuit by supplying, as power, an output of a joint of the auxiliary switch and a capacitor to the control circuit.

According to a second technical aspect of the present invention, the activator has a switch device that is provided between the joint and the control circuit and that is ON/OFF-controlled by the control circuit.

According to a third technical aspect of the present invention, the activator further has a resistor (R1) connected in series to the switch device or has a constant current unit.

According to a fourth technical aspect of the present invention, in addition to the first to the third technical aspects, the control circuit turns off the switch device while the control circuit is operative, and turns on the switch device while the control circuit is inoperative.

According to a fifth technical aspect of the present invention, in addition to the first technical aspect, the transformer has an auxiliary winding coupled with the primary winding, the activator has a switch that is turned ON/OFF by a voltage generated at the auxiliary winding and a constant current circuit that is controlled to be operated/non-operated by the switch, and the switch is turned on while the control circuit is operative and is turned off while the control circuit is inoperative, by the voltage generated at the auxiliary winding.

According to a sixth technical aspect of the present invention, in addition to the first technical aspect, the activator has a constant current circuit that is provided between the joint and the control circuit and that is controlled to be operated/non-operated by the control circuit.

According to a seventh technical aspect of the present invention, in addition to the sixth technical aspect, the control circuit turns off the switch device while the control circuit is operative, and turns on the switch device while the control circuit is inoperative.

DESCRIPTION OF THE PREFERRED EMBODIMENTS

Preferred embodiments of a DC converter according to the present invention will be explained in detail below with reference to the accompanying drawings.

First Embodiment

Figure 6:
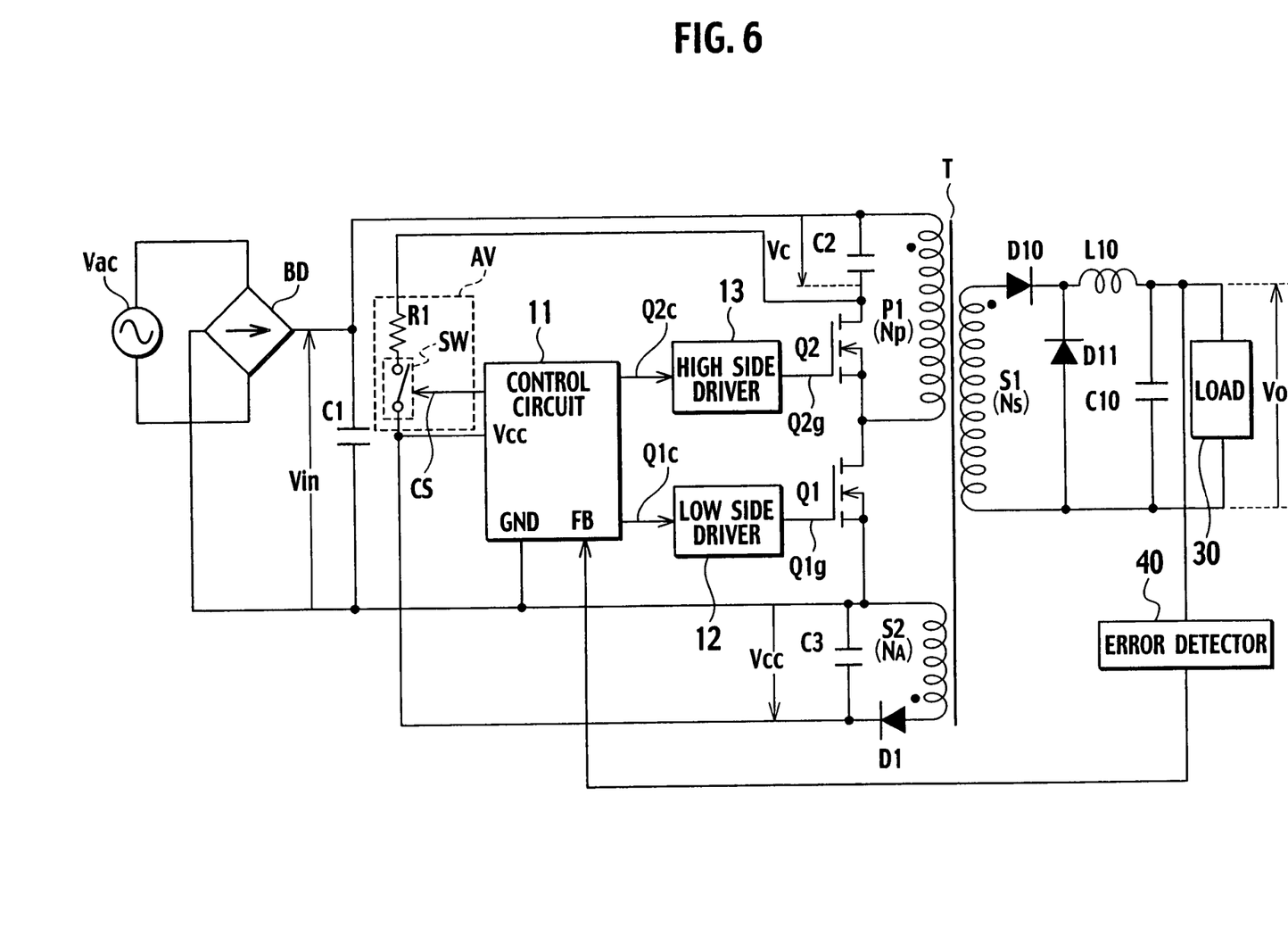
FIG. 6 is a circuit configuration diagram of a DC converter according to a first embodiment.

FIG. 6 is a circuit configuration diagram of a DC converter according to a first embodiment. In FIG. 6, like reference signs denote like constituent parts as those shown in FIG. 1, and details thereof will be omitted.

In the DC converter shown in FIG. 6, an activator AV that activates a control circuit 11 has a starting resistor R1 and a switch device SW. One end of the starting resistor R1 is connected to a joint of a capacitor C2 operable as an active-clamp capacitor and a drain of an auxiliary switch Q2, and the other end of the starting resistor R1 is connected via the switch SW to a control power line through which a voltage Vcc is supplied. The switch SW is opened and closed by a control signal CS fed from the control circuit 11.

A main switch Q1 and the auxiliary switch Q2 each have an OFF-period (dead time) for which they are turned OFF, and also they are turned ON/OFF alternately by PWM control of the control circuit 11.

The control circuit 11 generates a Q1 control signal Q1c for controlling ON/OFF of the main switch Q1 and the auxiliary switch Q2, and a Q2 control signal Q2c that has an inverted phase to the Q1 control signal Q1c. After the control circuit 11 is activated, it operates with a voltage Vcc generated by a control power supply constituted of a diode D1 and a capacitor C3.

The control circuit 11 turns on the switch SW until the voltage Vcc reaches an activation voltage of the control circuit 11, and generates the control signal CS for turning off the switch SW after the activation voltage is reached, so as to send the generated control signal CS to the switch SW.

The DC converter has a low side driver 12 and a high side driver 13. The low side driver 12 generates a Q1 gate signal Q1g by amplifying the Q1 control signal Q1c fed from the control circuit 11, and applies the Q1 gate signal Q1g to the gate of the main switch Q1 to activate it. The high side driver 13 generates a Q2 gate signal Q2g by amplifying the Q2 control signal Q2c fed from the control circuit 11, and applies the Q2 gate signal Q2g to the gate of the auxiliary switch Q2 to activate it.

An error detector 40 detects an error voltage between an output voltage Vo and a reference voltage, and provides this error voltage to the control circuit 11 as feedback.

Switching operations of the DC converter thus configured in the first embodiment are explained next.

When an AC power supply Vac is turned on, AC voltage of the AC power supply Vac is full-wave rectified at a bridge circuit BD, and is then applied to the capacitor C1. In a case where the voltage Vcc does not reach the activation voltage of the control circuit 11, the switch SW is turned on by the control signal CS fed from the control circuit 11.

Accordingly, an electrical charge stored in the capacitor C2 is discharged through the starting resistor R1 and the switch SW, and is then transferred to the capacitor C3. When the voltage Vcc thereafter increases and reaches the activation voltage of the control circuit 11, the switching operations of the main switch Q1 and the auxiliary switch Q2 are started, thereby starting DC converting operations.

When the main switch Q1 is turned on, a current flows from the input voltage Vin through a primary winding P1 of a transformer T into the main switch Q1. At this time, a current flows to a rectifying and smoothing circuit clockwise through a path passing along S1, D10, L10, C10, and S1.

Next, when the main switch Q1 is turned off, a parasite capacitor (not shown), which is formed in the main switch Q1 (between the drain and the source of FET), is charged due to energy stored in the primary winding P1 of the transformer T and in a leakage inductance between the primary and the secondary windings of the transformer T, so that voltage resonance is produced, and as a result, the voltage of the main switch Q1 increases. Current flows to the rectifying and smoothing circuit clockwise along a path passing along L10, C10, D11, and L10, thereby supplying the current to a load 30.

Next, when the auxiliary switch Q2 is turned on, the energy stored in the primary winding P1 of the transformer T is supplied to the capacitor C2, and accordingly the capacitor C2 is charged gradually. Subsequently, the energy stored in the capacitor C2 is discharged as a current flowing counterclockwise through a path passing along C2, Q2, P1, and C2.

Figure 7:
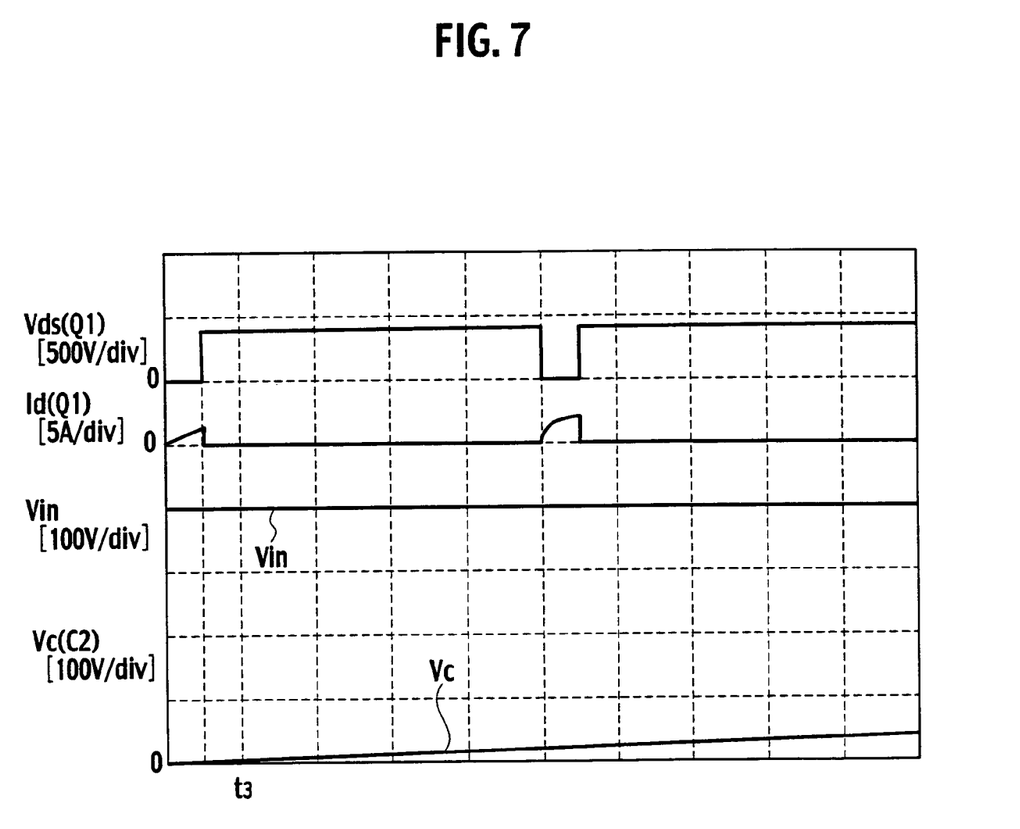
FIG. 7 is a timing chart of operations performed as the DC converter of the first embodiment is shifted from the-OFF state to the ON-state.

Operations of the DC converter in the first embodiment performed when it stops the DC converting operations and when it is started up again are explained below with reference to a timing chart shown in FIG. 7.

As already explained with reference to FIG. 4, when the supply of the AC power supply Vac is stopped at time t1, the input voltage Vin gradually decreases and the voltage Vc across the capacitor C2 gradually increases. Accordingly, the voltage Vcc generated at the auxiliary winding S2, the diode D1, and the capacitor C3 decreases.

When the voltage Vcc reaches the stop voltage of the control circuit 11 at time t2, the Q1 control signal Q1c and the Q2 control signal Q2c become low (L) level, and the main switch Q1 and the auxiliary switch Q2 become an OFF-state. Therefore, as shown in FIG. 4, the electrical charge of the capacitor C2 is maintained, and the voltage Vc across the capacitor C2 remains high. As a consequence, the DC converting operations are stopped.

When the AC power supply Vac is turned on again and then the input voltage Vin is reapplied while the supply of the AC power supply Vac is being stopped, the main switch Q1 and the auxiliary switch Q2 start ON/OFF operations in an alternate manner. At this time, since the switch SW is being turned on by the control signal CS fed from the control circuit 11 until the voltage Vcc reaches the activation voltage of the control circuit 11, the electrical charge stored in the capacitor C2 is discharged through the starting resistor and then transferred to the capacitor C3. Accordingly, envelope waveforms (loci of the maximum values of each waveform) become as shown in FIG. 7, where the voltage Vc held in the capacitor C2 is zero at the time when the auxiliary switch Q2 is turned on at time t3, and therefore only the input voltage Vin is applied to the main switch Q1.

Consequently, the same voltage as that in the steady state is applied to the main switch Q1, thereby eliminating the need to use a device with a high withstand voltage as the main switch Q1. Thus, it is possible to configure a DC converter at low cost, reduce losses, and increase conversion efficiency.

Second Embodiment

Figure 8:
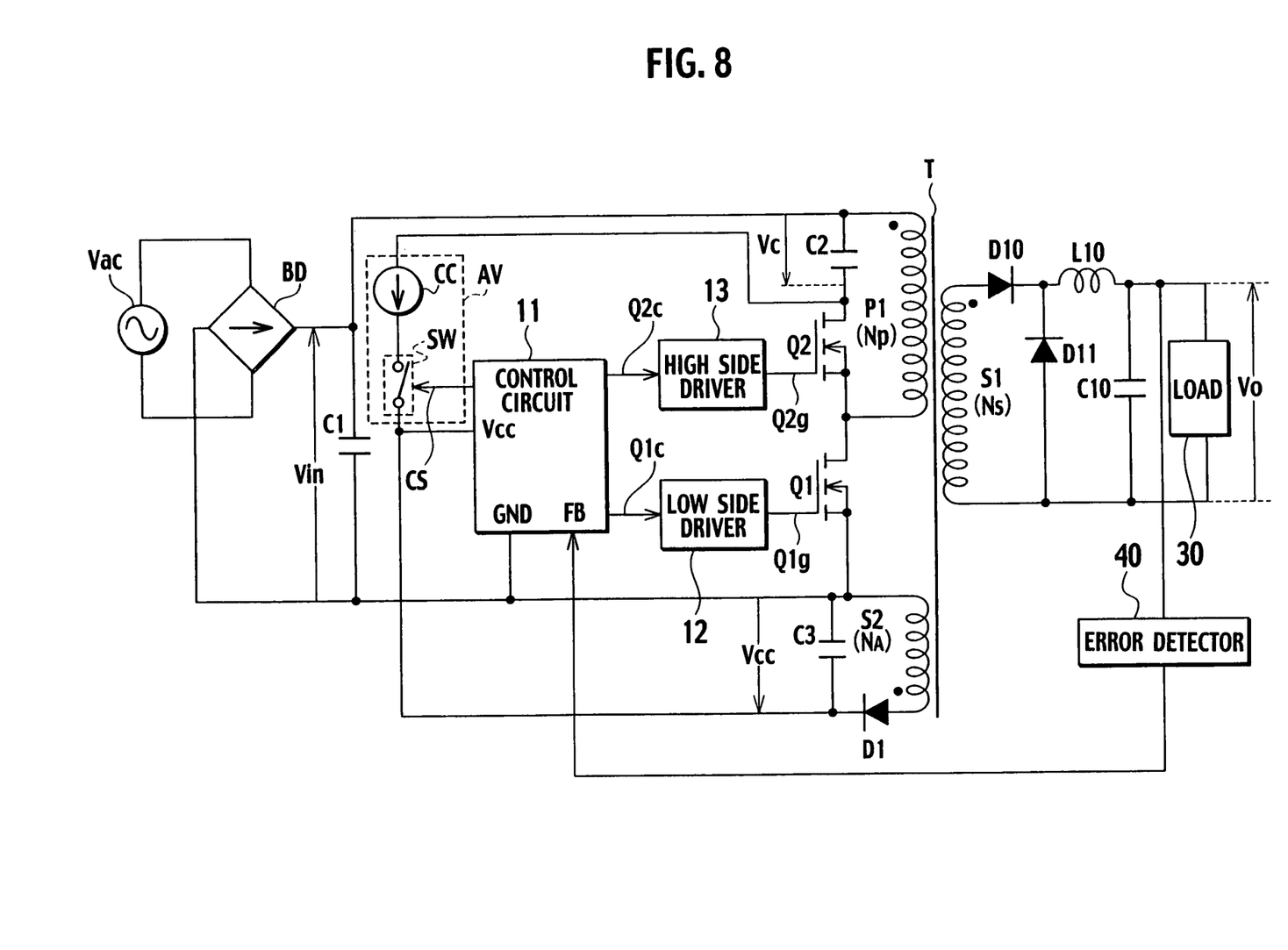
FIG. 8 is a circuit configuration diagram of a DC converter according to a second embodiment.

A DC converter according to a second embodiment will be explained next. In the DC converter of the second embodiment, a constant current source CC is used instead of the starting resistor R1 in the DC converter of the first embodiment.

FIG. 8 is a circuit configuration diagram of the DC converter in the second embodiment. In this DC converter, the activator AV that activates the control circuit 11 has the constant current source CC and the switch SW. That is, the starting resistor R1 of the DC converter in the first embodiment shown in FIG. 6 is replaced with the constant current source CC.

The constant current source CC corresponds to a constant current unit of the present invention, and outputs an electrical charge stored in the capacitor C2 at a constant current. As is apparent to those skilled in the art, various known circuits can be used as this constant current source CC.

According to the DC converter of the second embodiment, in the similar manner to the DC converter of the first embodiment, even when the AC power supply Vac is turned on again and then the input voltage Vin is reapplied while the supply of the AC power supply Vac is being stopped, only the input voltage Vin is applied to the main switch Q1. That is, the same voltage as that in the steady state is applied to the main switch Q1, thereby eliminating the need to use a device with a high withstand voltage as the main switch Q1. Accordingly, it is possible to configure a DC converter at low cost, reduce losses, and increase conversion efficiency.

Third Embodiment

Figure 9:
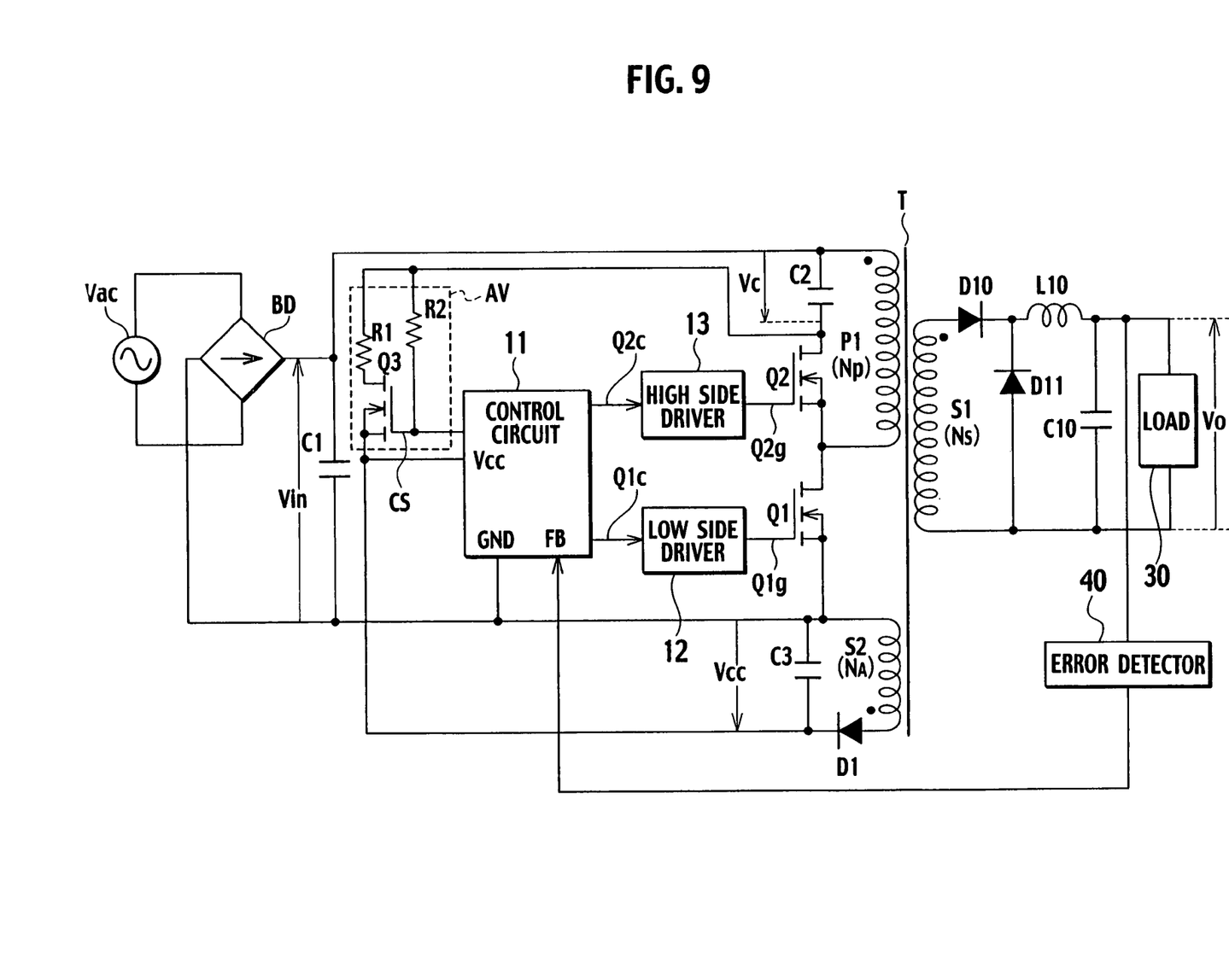
FIG. 9 is a circuit configuration diagram of a DC converter according to a third embodiment.

A DC converter according to a third embodiment uses a transistor as the switch SW in the DC converter of the first embodiment.

FIG. 9 is a circuit configuration diagram of the DC converter in the third embodiment. In this DC converter, an activator that activates the control circuit 11 has a starting resistor R1, an FET switch Q3, and a resistor R2. That is, this DC converter uses the switch Q3 as the switch device SW of the DC converter shown in FIG. 6, and additionally includes the resistor R2.

The source of the switch Q3 is connected to a control power line (voltage Vcc), the drain thereof is connected to the starting resistor R1, and the gate thereof is connected to the control circuit 11. A control signal CS is fed from the control circuit 11 to this gate of the switch Q3. The resistor R2 is connected between a joint of the capacitor C2 and the auxiliary switch Q2, and the gate of the switch Q3.

According to the DC converter thus configured in the third embodiment, when the voltage Vcc does not reach the activation voltage of the control circuit 11 after the AC power supply Vac is turned on, the switch Q3 is turned on by the control signal CS being fed from the control circuit 11. Therefore, an electrical charge stored in the capacitor C2 is discharged along a path passing along C2, R1, Q3, and C3 and then transferred to the capacitor C3. When the voltage Vcc thereafter increases and reaches the activation voltage of the control circuit 11, the switching operations of the main switch Q1 and the auxiliary switch Q2 are started.

When the AC power supply Vac is turned on again and then the input voltage Vin is reapplied while the supply of the AC power supply Vac is being stopped, the switch Q3 is turned on by the control signal CS being fed from the control circuit 11 until the voltage Vcc reaches the activation voltage of the control circuit 11. Therefore, the electrical charge stored in the capacitor C2 is transferred to the capacitor C3 and discharged therefrom. Accordingly, only the input voltage Vin is applied to the main switch Q1. That is, the DC converter of the third embodiment operates similarly to that of the first embodiment, and the same advantageous effect can be obtained.

Fourth Embodiment

Figure 10:
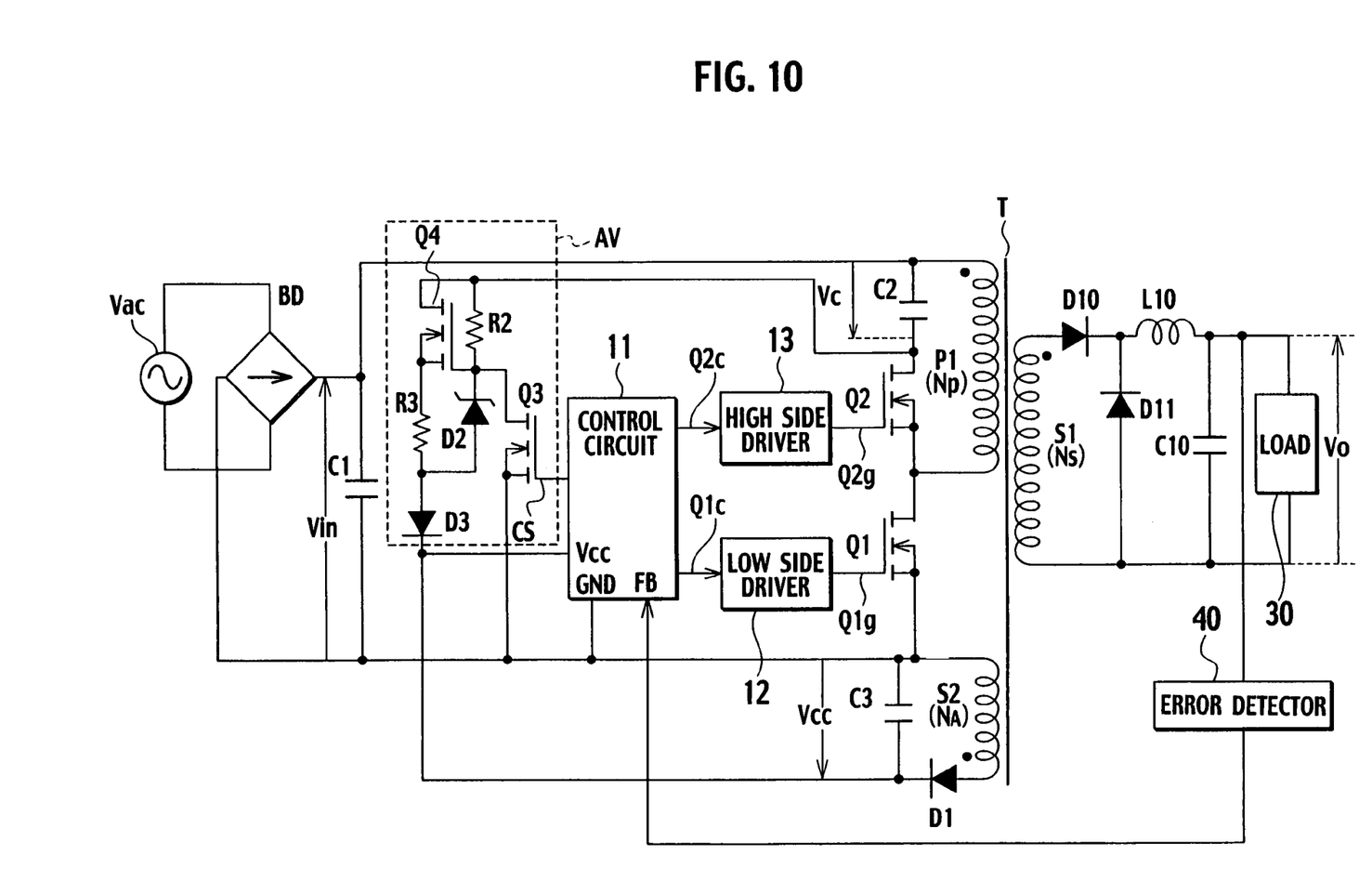
FIG. 10 is a circuit configuration diagram of a DC converter according to a fourth embodiment.

FIG. 10 is a circuit configuration diagram of a DC converter according to a fourth embodiment. In this DC converter, an activator that activates the control circuit 11 includes an FET switch Q4, the resistor R2, a resistor R3, a constant current circuit-having a zener diode D2 and a diode D3, and an FET switch Q3 that controls operative/inoperative states of this constant current circuit. The drain of the switch Q4 is connected to a joint of the capacitor C2 and the auxiliary switch Q2, and the source of the switch Q4 is connected to the anode of the diode D3 through the resistor R3. The cathode of the diode D3 is connected to a control power line (voltage Vcc) of the diode D3.

One end of the resistor R2 is connected to the joint of the capacitor C2 and the auxiliary switch Q2, and the other end of the resistor R2 is connected to the gate of the switch Q4, the cathode of the zener diode D2, and the drain of the switch Q3. The anode of the zener diode D2 is connected to a joint of the resistor R3 and the diode D3. The source of the switch Q3 is connected to a ground line (GND), and the gate of the switch Q3 is connected to the control circuit 11. The control signal CS is fed from the control circuit 11 to this gate of the switch Q3.

Before the voltage Vcc reaches the activation voltage of the control circuit 11, the control circuit 11 generates a control signal CS for turning off the switch Q3 and transfers the generated control signal CS thereto, and after the voltage Vcc reaches the activation voltage, the control circuit 11 generates a control signal CS for turning on the switch Q3 and transfers the generated control signal CS thereto.

According to the DC converter thus configured in the fourth embodiment, when the AC power supply Vac is turned on and the voltage Vcc does not reach the activation voltage of the control circuit 11, the switch Q3 is turned off by the control signal, CS being fed from the control circuit 11. Therefore, the switch Q4 is turned on, and an electrical charge stored in the capacitor C2 is transferred to the capacitor C3 and then discharged therefrom. When the voltage Vcc thereafter increases and reaches the activation voltage of the control circuit 11, the switching operations of the main switch Q1 and the auxiliary switch Q2 are started.

When the AC power supply Vac is turned on again and then the input voltage Vin is reapplied while the supply of the AC power supply Vac is being stopped, the switch Q3 is turned off by the control signal CS being fed from the control circuit 11 before the voltage Vcc reaches the activation voltage of the control circuit 11, and accordingly the switch Q4 is turned on, so that the electrical charge stored in the capacitor C2 is discharged and transferred to the capacitor C3. Therefore, only the input voltage Vin is applied to the main switch Q1. That is, the DC converter of the fourth embodiment operates in a similar manner to that of the first embodiment, and hence the same advantageous effect can be obtained.

Fifth Embodiment

Figure 11:
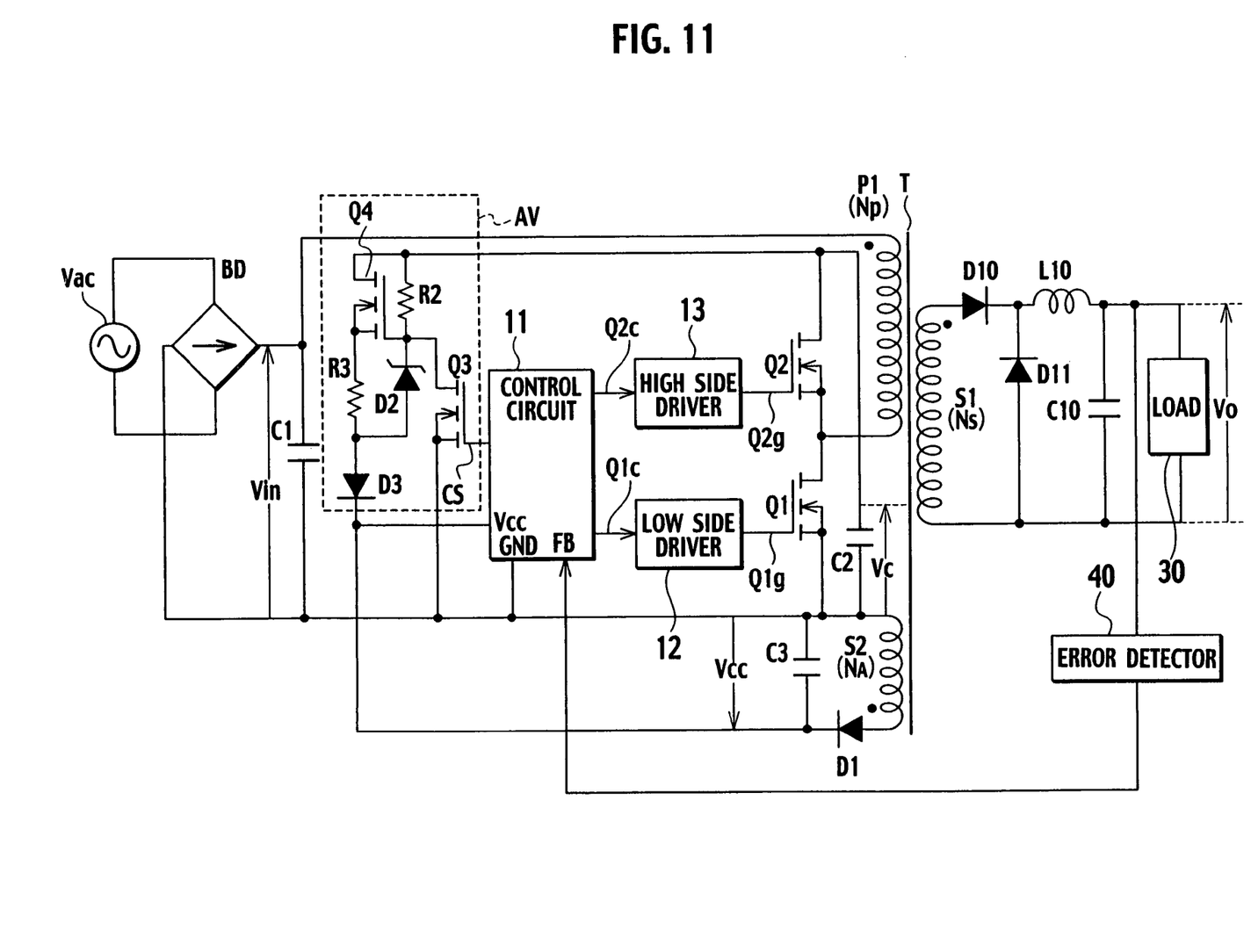
FIG. 11 is a circuit configuration diagram of a DC converter according to a fifth embodiment.

FIG. 11 is a circuit configuration diagram of a DC converter according to a fifth embodiment. This DC converter is different from that of the fourth embodiment in that one end of the capacitor C2 is connected to a joint of the auxiliary switch Q2 and the ground.

The DC converter of the fifth embodiment thus configured operates similarly to that of the fourth embodiment, and hence the same advantageous effect can be obtained.

Sixth Embodiment

Figure 12:
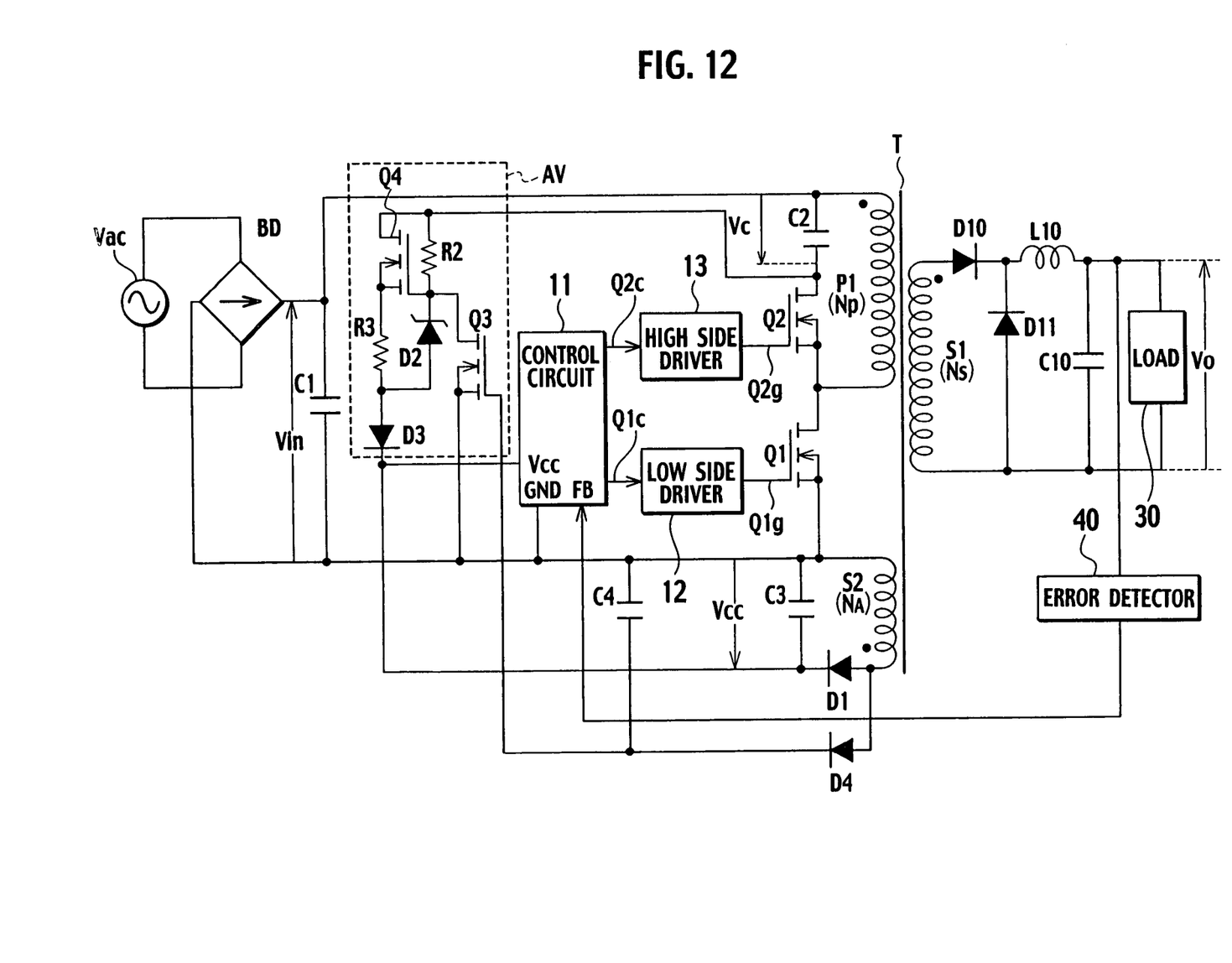
FIG. 12 is a circuit configuration diagram of a DC converter according to a sixth embodiment.

FIG. 12 is a circuit configuration diagram of a DC converter according to a sixth embodiment. This DC converter includes a diode D4 and a capacitor C4 in addition to the configuration of the DC converter in the fourth embodiment shown in FIG. 10. The cathode of the diode D4 is connected to the gate of the switch Q3, and the anode of the diode D4 is connected to a joint of the auxiliary winding S2 of the transformer T and the anode of the diode D1. The capacitor C4 is connected between the cathode of the diode D4 and the source of the switch Q3.

According to the DC converter thus configured in the sixth embodiment, when the voltage Vcc does not reach the activation voltage of the control circuit 11 after the AC power supply Vac is turned on, the switches Q1 and Q2 are off and no voltage is generated at the auxiliary winding S2, so that the switch Q3 is also off. Accordingly, the switch Q4 is turned on, and an electrical charge stored in the capacitor C2 is discharged and transferred to the capacitor C3. When the voltage Vcc thereafter increases to reach the activation voltage of the control circuit 11, the switching operations of the main switch Q1 and the auxiliary switch Q2 are started. In response thereto, voltage is generated at the auxiliary winding S2, thereby turning on the switch Q3 and turning off the switch Q4.

When the AC power supply Vac is turned on again and then the input voltage Vin is reapplied while the supply of the AC power supply Vac is being stopped, the electrical charge stored in the capacitor C2 is discharged and transferred to the capacitor C3, because the switch Q3 is off and the switch Q4 is on since no voltage is generated at the auxiliary winding S2 before the voltage Vcc reaches the activation voltage of the control circuit 11. Accordingly, only the input voltage Vin is applied to the main switch Q1. That is, the DC converter of the sixth embodiment operates in a similar manner to that of the first embodiment, and hence the same advantageous effect can be obtained. Furthermore, it is no longer necessary to generate the control signal CS in the control circuit 11, thereby simplifying the configuration of the control circuit 11.

Although the series circuit of the auxiliary switch Q2 and the capacitor C2 is connected to the both ends of the primary winding P1 of the transformer T in the first to the sixth embodiments described above, this series circuit can be connected, for example, to the both ends of the main switch Q1.

While only the parasite capacitor (not shown) is provided to the main switch Q1 in the first to the sixth embodiments described above, an additional capacitor can be connected to the both ends of the main switch Q1.

In the first to the sixth embodiments, the bridge circuit BD that rectifies the AC voltage of the AC power supply to obtain a rectified voltage is connected to the both ends of the series circuit of the primary winding P1 of the transformer T and the main switch Q1. For example, a DC power supply can also be connected to the both ends of the series circuit of the primary winding P1 of the transformer T and the main switch Q1.

Effects of the Invention

According to the present invention, the power for activating the control circuit is obtained from an active-clamp capacitor, so that an electrical charge stored in the active-clamp capacitor can be discharged by transferring it to a capacitor as a control power source of the control circuit.

Therefore, even when a DC converter is activated again after DC converting operations thereof are stopped, high voltage is not charged in the active-clamp capacitor, so that a voltage, larger than that in the steady state is not applied to the main switch. As a result, a device with a high withstand voltage is not required as the main switch, thereby providing an inexpensive and high-efficiency DC converter.

INDUSTRIAL APPLICABILITY

The present invention is applicable to a DC—DC converting power supply circuit and an AC–DC converting power supply circuit.

This application claims benefit of priority under 35USC §119 to Japanese Patent Applications No. 2005-001399, filed on Jan. 6, 2005, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A DC converter having a main switch connected in series with a primary winding of a transformer, and a series circuit of a capacitor and an auxiliary switch, the series circuit being connected to both ends of the primary winding of the transformer or to both ends of the main switch, and rectifying and smoothing a voltage of a secondary winding of the transformer to provide a DC output by alternate ON/OFF operations of the main switch and the auxiliary switch, the DC converter comprising:

an error detector detecting an error by comparing the DC output to a reference voltage;

a control circuit controlling ON/OFF states of the main switch and the auxiliary switch based on the error detected by the error detector; and an activator that activates the control circuit by supplying an output of a joint of the auxiliary switch and a capacitor to the control circuit as a power source.

2. The DC converter according to claim 1, wherein the activator has a switch device being provided between the joint and the control circuit and that is ON/OFF-controlled by the control circuit.

3. The DC converter according to claim 2, wherein the activator further has a resistor connected in series to the switch device.

4. The DC converter according to claim 2, wherein the activator further has a constant current source connected in series to the switch device.

5. The DC converter according to claim 2, wherein the control circuit turns off the switch device while the control circuit is operative, and turns on the switch device while the control circuit is inoperative.

6. The DC converter according to claim 3, wherein the control circuit turns off the switch device while the control circuit is operative, and turns on the switch device while the control circuit is inoperative.

7. The DC converter according to claim 4, wherein the control circuit turns off the switch device while the control circuit is operative, and turns on the switch device while the control circuit is inoperative.

8. The DC converter according to claim 1, wherein the transformer has an auxiliary winding being coupled with the primary winding, the activator has a switch that is turned ON/OFF by a voltage generated at the auxiliary winding, and a constant current circuit that is controlled to be operative/inoperative by the switch, and the switch is turned on while the control circuit is operative and is turned off while the control circuit is inoperative, by the voltage generated at the auxiliary winding.

9. The DC converter according to claim 1, wherein the activator has a switch controlled as ON/OFF state by the control circuit and a constant current circuit controlled as operative/inoperative by the switch; and the control circuit turns on the switch while the control circuit is operative, and turns off the switch while the control circuit is inoperative.

* * * * *